(12) United States Patent
Cook

(10) Patent No.: US 6,458,738 B1
(45) Date of Patent: Oct. 1, 2002

(54) SPRAY-DRYING COMPOSITIONS AND METHODS OF SPRAY-DRYING

(75) Inventor: Jessica Ann Cook, Clinton, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/668,227

(22) Filed: Sep. 22, 2000

(51) Int. Cl.⁷ .............................. B01J 31/38; C08F 4/44
(52) U.S. Cl. .................. 502/118; 502/152; 502/155; 526/89; 526/161; 526/171; 526/172
(58) Field of Search .................. 526/161, 170, 526/160, 172, 89; 502/105, 104, 152, 155, 117, 118

(56) References Cited

U.S. PATENT DOCUMENTS

| | | | |
|---|---|---|---|
| 4,638,029 A | * | 1/1987 | Meschke et al. ............ 524/430 |
| 4,931,517 A | | 6/1990 | Fujita ......................... 526/128 |
| 4,945,076 A | | 7/1990 | Piotrowski et al. ......... 502/117 |
| 5,290,745 A | | 3/1994 | Jorgensen et al. |
| 5,391,529 A | | 2/1995 | Sangokoya .................. 502/103 |
| 5,672,669 A | * | 9/1997 | Wasserman et al. ........ 526/170 |
| 5,900,384 A | | 5/1999 | Soltani-Ahmadi et al. |
| 5,922,631 A | | 7/1999 | Sangokoya .................. 502/121 |
| 5,972,835 A | | 10/1999 | Gupta |

FOREIGN PATENT DOCUMENTS

| | | |
|---|---|---|
| CA | 2237231 | 11/1999 |
| EP | 0 352 715 | 1/1990 |
| EP | 0 925 831 A2 | 6/1999 |

* cited by examiner

Primary Examiner—David W. Wu
Assistant Examiner—R. Harlan

(57) ABSTRACT

A spray-dryable composition is provided, comprising a catalyst compound, an activator for the catalyst compound, and at least one compound selected from among siloxanes, polyethylene glycols and crown ethers, the composition optionally further comprising a filler. There are further provided a method of spray-drying such a composition, and polymerization processes which employ such spray-dried compositions.

11 Claims, 3 Drawing Sheets

SPRAY-DRYING COMPOSITIONS AND METHODS OF SPRAY-DRYING

FIELD OF THE INVENTION

The invention relates to a family of novel compositions which exhibit excellent properties when spray-dried, as well as novel methods of spray-drying compositions. In particular, the invention provides methods for spray-drying catalyst compounds, in which the resulting spray-dried catalyst materials exhibit properties which are desirable for use in catalysis, as well as compositions used in such spray-drying methods.

BACKGROUND OF THE INVENTION

A number of methodologies used for delivering catalysts to reactors require that the catalyst be supported, e.g., by impregnating the catalyst on an inert carrier such as silica. Impregnating a catalyst on a support has often been found to cause a significant decrease in catalyst activity. In addition, large particles (>25 micrometers) of the support material, e.g., silica, have frequently been found in the finished polymer product, where they may adversely affect polymer properties. This has been observed in film applications where unexploded silica particles appear as defects or gels.

Spray-drying techniques have been applied to catalyst compositions, e.g., as an alternative to impregnating the catalyst on a support. For example, U.S. Pat. No. 5,290,745 discloses preparing a solution of titanium trichloride and magnesium dichloride in an electron donor compound (e.g., tetrahydrofuran), admixing the solution with a filler, heating the resulting slurry to a temperature as high as the boiling point of the electron donor compound; and then atomizing the slurry by means of a suitable atomizing device to form discrete spherically shaped particles.

However, it has been found that it is very difficult to closely control morphology of the product obtained by spray-drying of catalyst compositions. In addition, it has been found that it is very difficult to consistently obtain spray-dried catalyst particles which have a high degree of products having uniform sizes and high degrees of sphericity. These problems have been particularly troublesome with regard to spray-drying catalyst compositions containing catalyst materials such as single-site catalysts together with alumoxane activator.

There is an ongoing need for methods of spray-drying catalyst compositions which result in product having good integrity and having higher activity and/or improved morphology, in particular, degree of sphericity and particle size uniformity. In particular, there is a need for such methods of spray-drying catalyst compositions, wherein the catalyst composition comprises a catalyst compound, a catalyst activator and a filler. The compositions and spray-drying methods of the present invention satisfy these needs.

SUMMARY OF THE INVENTION

The present invention provides catalyst compositions and methods of spray-drying such compositions. According to the present invention, the catalyst compositions comprise, in addition to a catalyst compound, an activator for the catalyst and a filler, one or more compound selected from among siloxanes, polyethylene glycols and crown ethers.

In accordance with the present invention, the inclusion of one or more compound selected from among siloxanes, polyethylene glycols and crown ethers in the catalyst compositions of the present invention results in spray-dried products which exhibit high degrees of uniformity of particle size and sphericity, i.e., extremely useful morphology, and provide excellent activity. The present invention is particularly effective where the catalyst compound does not include any cyclopentadiene ligands.

The invention further provides a process for producing an olefin polymer, which comprises contacting at least one olefin monomer under polymerization conditions with a product of spray-drying a catalyst composition as described above.

BRIEF DESCRIPTION OF THE DRAWING FIGURES

DETAILED DESCRIPTION OF THE INVENTION

Figure 1:
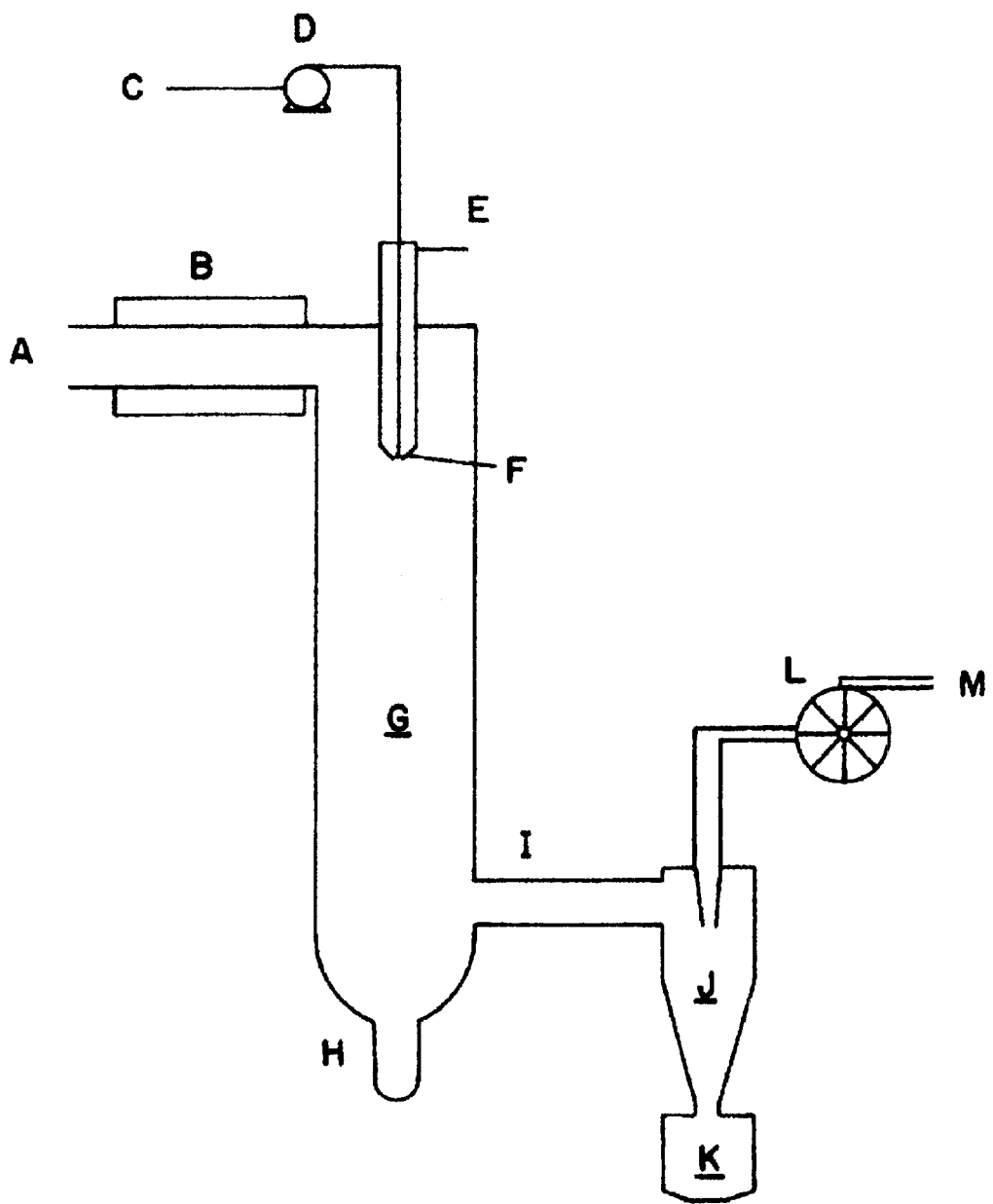
FIG. 1 is a schematic representation of an example of an apparatus which is suitable for performing spray-drying in the present invention.

In this specification, the term "olefinically unsaturated hydrocarbons" is often represented for convenience by "olefins".

The expression "copolymer" (and other terms incorporating this root), as used herein, refers to polymers containing two or more comonomers, i.e, it encompasses copolymers, terpolymers, etc.

The expression "catalyst compound" as used herein encompasses compounds referred to as "precursors" and "catalyst precursors". Preferred catalyst compounds include non-metallocene catalysts, such as catalyst compounds disclosed in WO 99/01460, WO 98/30609, WO 96/23010, EP 924 223, WO 99/46302, WO 97/48737, WO 97/48735 and WO 97/38024 (the entireties of which are hereby expressly incorporated herein by reference).

WO 99/01460 discloses catalysts for polymerization of olefins having the formula:

$(A_2)_q M(L_4)_n$, where:
each $A_2$ has a formula corresponding to formula (I):

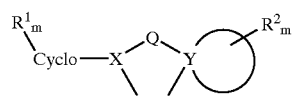

M is an element selected from among the elements in Group 3–Group 13 and Lanthanide elements, preferably Group 4, preferably Zr;

each $L_4$ is a monovalent, bivalent or trivalent anion, preferably selected from hydrogen, the halogens, $C_{1-50}$ alkyl, $C_{1-50}$ aryl, $C_{1-50}$ alkenyl, $C_{1-50}$ alkylaryl, $C_{1-50}$ arylalkyl, $C_{1-50}$ hydrocarboxy, $C_{1-50}$ amide, $C_{1-50}$ phosphide, $C_{1-50}$ sulfide, $C_{1-50}$ silylalkyl, $C_{1-50}$ diketonate and $C_{1-50}$ carboxylate;

q is 1 or 2, and when q is 2, the $A_2$ groups as defined above may be joined by a bridging group Z, bridging group Z preferably containing at least one Group IIIA, IVA, VA or VIA element;

n is an integer from 1 to 4; each $R^1$ independently contains 1–50 atoms and is selected from among hydrogen, Group 13–Group 17 elements, and 2 or more adjacent $R^1$ groups may be joined to form a cyclic moiety (such a cyclic moiety preferably being selected from aliphatic rings or aromatic rings), preferred $R^1$ groups being alkyl groups, e.g., isopropyl;

each $R^2$ independently contains 1–50 atoms and is selected from among hydrogen, Group 13–Group 17 elements, preferred $R^2$ groups being hydrogen or aryl;

Q is a bridging group, preferably containing at least one Group 13–Group 16 element, preferred Q groups being substituted C;

each m is independently an integer from 0 to 5;

X and Y are independently heteroatoms, Y being contained in a heterocyclic ring (which may contain additional heteroatoms) containing 2 to 7 C atoms, X and Y preferably being selected from among N, O, S and P;

Cyclo is a cyclic moiety, preferably a $C_{3-7}$ carbocyclic ring.

Catalyst compounds disclosed in WO 99/01460 which are especially preferred in accordance with the present invention include the following compounds:

Compound 1

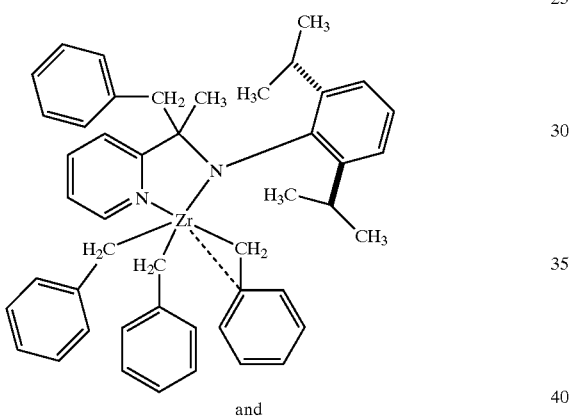

and

Compound 2

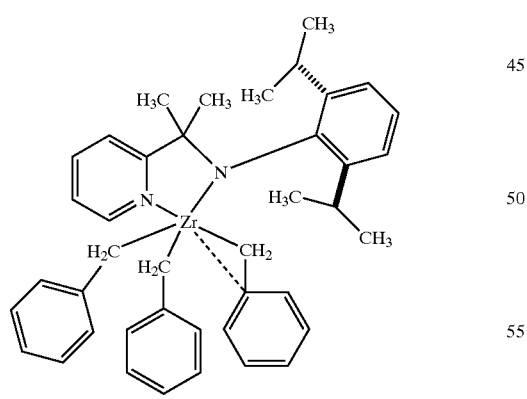

WO 99/01460 describes how such catalyst compounds can be produced, as well as suitable co-catalysts, reactants, reactions conditions, etc.

Additional catalyst compounds which are preferred according to the present invention include non-metallocene catalysts disclosed in WO 98/30609, (the entirety of which is hereby expressly incorporated herein by reference), i.e., compounds of the formulas I, II, III, IV, V, VI, XVIII, XXVII, XXXVII, XXXVIII, XXXIX and XXXX as disclosed in WO 98/30609, i.e.:

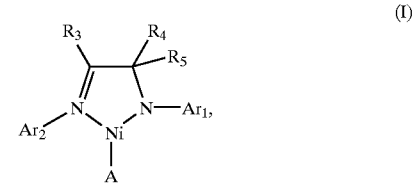

(I)

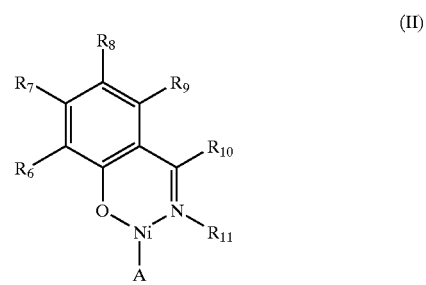

(II)

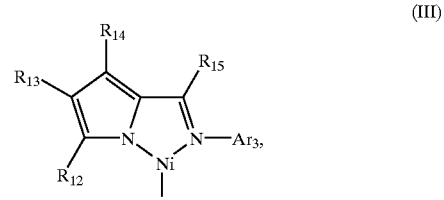

(III)

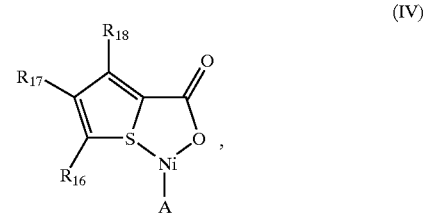

(IV)

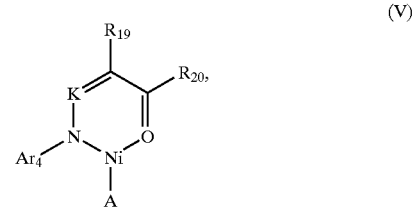

(V)

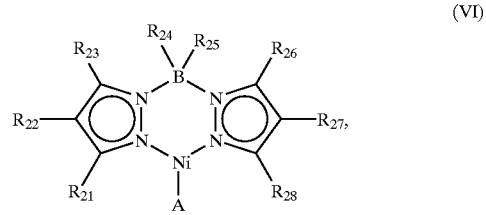

(VI)

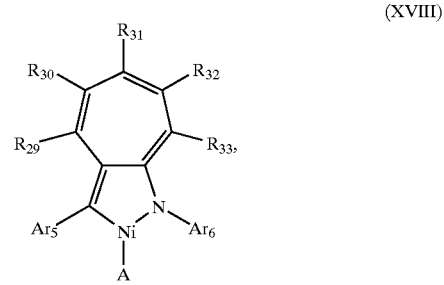

(XVIII)

-continued

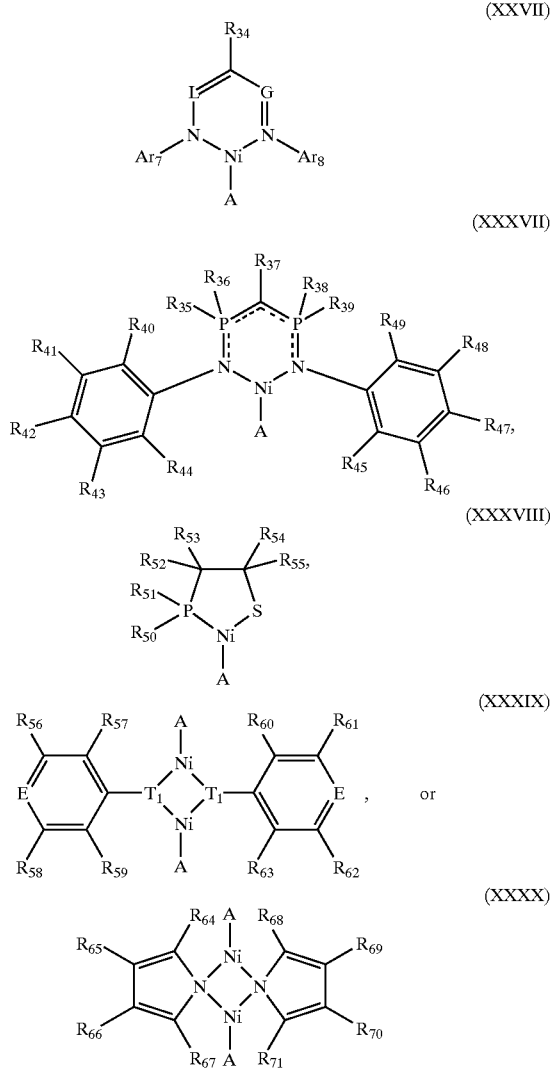

wherein:
- $Ar_1$, $Ar_2$, $Ar_3$, $Ar_4$, $Ar_5$, $Ar_6$, $Ar_7$ and $Ar_8$ are each independently aryl or substituted aryl;
- $R_3$ and $R_4$ are each independently hydrogen, hydrocarbyl, substituted hydrocarbyl, or $R_3$ and $R_4$ taken together form a ring, and $R_5$ is hydrogen, hydrocarbyl or substituted hydrocarbyl, or $R_3$, $R_4$ and $R_5$ together form a ring;
- A is a π-allyl or π-benzyl group;
- $R^{10}$ and $R^{15}$ are each independently hydrogen, hydrocarbyl or substituted hydrocarbyl;
- $R_6$, $R_7$, $R_8$, $R_9$, $R_{12}$, $R_{13}$, $R_{14}$, $R_{16}$, $R_{17}$, $R_{18}$, $R_{21}$, $R_{22}$, $R_{23}$, $R_{26}$, $R_{27}$, $R_{28}$, $R_{29}$, $R_{30}$, $R_{31}$, $R_{32}$ and $R_{33}$ are each independently hydrogen, hydrocarbyl, substituted hydrocarbyl, or an inert functional group, and provided that any two of these groups vicinal to one another taken together may form a ring;
- K is N or $CR_{99}$;
- $R_{20}$ is hydrocarbyl, substituted hydrocarbyl, —$SR_{100}$, —$OR_{100}$, or —$N(R_{101})_2$, $R_{19}$ is hydrogen, a functional group, hydrocarbyl or substituted hydrocarbyl, and $R_{99}$ is hydrocarbyl or substituted hydrocarbyl, and provided that $R_{19}$ and $R_{20}$ or $R_{19}$ and $R_{99}$ taken together may form a ring;
- $R_{100}$ is hydrocarbyl or substituted hydrocarbyl;
- each $R_{101}$ is independently hydrogen, hydrocarbyl or substituted hydrocarbyl;
- G and L are both N or G is $CR_{102}$ and L is $CR_{103}$;
- $R_{103}$, $R_{34}$ and $R_{102}$ are each independently hydrogen, hydrocarbyl or substituted hydrocarbyl, or any two of $R_{103}$, $R_{34}$ and $R_{102}$ taken together form a ring;
- $R_{11}$ is hydrocarbyl or substituted hydrocarbyl;
- $R_{37}$, $R_{40}$, $R_{41}$, $R_{42}$, $R_{43}$, $R_{44}$, $R_{45}$, $R_{46}$, $R_{47}$, $R_{48}$ and $R_{49}$ are each independently hydrogen, hydrocarbyl, substituted hydrocarbyl, or a functional group;
- $R_{35}$, $R_{36}$, $R_{38}$ and $R_{39}$ are each independently hydrocarbyl or substituted hydrocarbyl;
- $R_{50}$ and $R_{51}$ are each independently hydrocarbyl or substituted hydrocarbyl;
- $R_{52}$, $R_{53}$, $R_{54}$ and $R_{55}$ are each independently hydrogen, hydrocarbyl, substituted hydrocarbyl or a functional group;
- both of $T_1$ are S (sulfur) or NH (amino);
- each E is N (nitrogen) or $CR_{104}$ wherein $R_{104}$ is hydrogen, hydrocarbyl, substituted hydrocarbyl or a functional group;
- $R_{56}$, $R_{57}$, $R_{58}$, $R_{59}$, $R_{60}$, $R_{61}$, $R_{62}$ and $R_{63}$ are each independently hydrogen, hydrocarbyl, substituted hydrocarbyl, or a functional group;
- $R_{64}$, $R_{65}$, $R_{66}$, $R_{67}$, $R_{68}$, $R_{69}$, $R_{70}$ and $R_{71}$ are each independently hydrogen, hydrocarbyl, substituted hydrocarbyl or a functional group;
- s is an integer of 1 or more; and
- $R_{24}$ and $R_{25}$ are each independently hydrogen, hydrocarbyl or substituted hydrocarbyl, as well as catalyst compounds as set forth above except that A is not present, a group $L^1$ is present, single-bonded to Ni, and a group $L^2$ is present, also single-bonded to Ni, wherein:
  - $L^1$ is a neutral monodentate ligand which may be displaced by an olefin reactant, and $L^2$ is a monoanionic monodentate ligand, or $L^1$ and $L^2$ taken together are a monoanionic bidentate ligand, provided that the monoanionic monodentate ligand or the monoanionic bidentate ligand may add to an olefin reactant.

Some of the above compounds from WO 98/30609 may exist as dimers or monomers, or in equilibrium between the two.

Catalyst compounds which are especially preferred in accordance with the present invention include compounds having the formula:

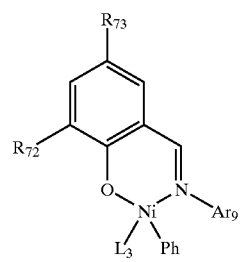

in which $L_3$ is selected from among monovalent, bivalent or trivalent anion, preferably selected from hydrogen, the halogens, $C_{1-50}$ alkyl, $C_{1-50}$ aryl, $C_{1-50}$ alkenyl, $C_{1-50}$ alkylaryl, $C_{1-50}$ arylalkyl, $C_{1-50}$ hydrocarboxy, $C_{1-50}$ amide, $C_{1-50}$ phosphide, $C_{1-50}$ sulfide, $C_{1-50}$ silylaklyl, $C_{1-50}$ diketonate and $C_{1-50}$ carboxylate;

$Ar_9$ is unsubstituted aryl or substituted aryl (substituents preferably selected from among hydrocarbyl, oxyhydrocarbyl and hydrocarbyloxy groups);

Ph is a phenyl group: and $R_{72}$ and $R_{73}$ are each independently selected from among hydrogen, hydrocarbyl, substituted hydrocarbyl (substituents preferably selected from among hydrocarbyl, oxyhydrocarbyl and hydrocarbyloxy groups), or a functional group.

Compounds which are particularly preferred for use in accordance with the present invention include those having the formula:

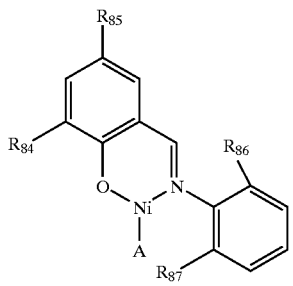

where A is a π-allyl or π-benzyl group; and $R_{84}$, $R_{85}$, $R_{86}$ and $R_{87}$ are each independently selected from among alkyl groups, preferably isopropyl.

Additional catalyst compounds which are preferred according to the present invention include non-metallocene catalysts disclosed in WO 96/23010, EP 924 223, WO 99/46302, WO 97/48737, WO 97/48735 and WO 97/38024, the entireties of which were above expressly incorporated herein by reference.

Catalyst compounds disclosed in WO 96/23010 which are especially preferred in accordance with the present invention include compounds of the formula:

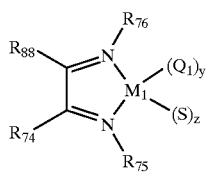

wherein:

$M_1$ is Ti, Zr, Sc, V, Cr, a rare earth metal, Fe, Co, Ni or Pd, having an oxidation state j;

$y+z=i$;

$R_{75}$ and $R_{76}$ are each independently hydrocarbyl or substituted hydrocarbyl, provided that the carbon atom bound to the imino nitrogen atom has at least two carbon atoms bound to it;

$R_{74}$ and $R_{88}$ are each independently hydrogen, hydrocarbyl, substituted hydrocarbyl, or $R_{74}$ and $R_{88}$ taken together are hydrocarbylene or substituted hyrdocarbylene to form a ring; and $Q_1$ and S are each independently selected from among alkyl, hydride, chloride, iodide or bromide.

Compounds which are especially preferred for use in accordance with the present invention include those having the formula:

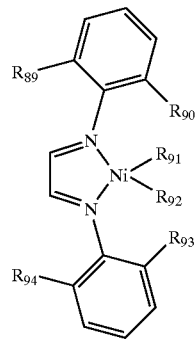

wherein $R_{89}$, $R_{90}$, $R_{93}$ and $R_{94}$ are each independently selected from among alkyls, preferably isopropyl, and $R_{91}$ and $R_{92}$ are each independently selected from among alkyls, preferably methyl.

Catalyst compounds disclosed in WO 99/46302 which are especially preferred in accordance with the present invention include compounds of the formula:

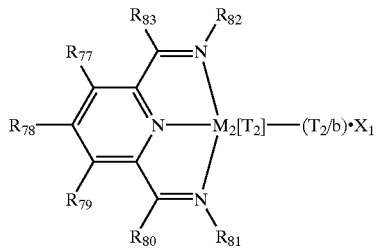

wherein:

$M_2$ is Fe[II], Fe[III], Co[I], Co[II], Co[III], Mn[I], Mn[II], Mn[III], Mn[IV], Ru[II], Ru[III], or Ru[IV];

$X_1$ is an atom or group covalently or jonically bonded to $M_2$;

$T_2$ is the oxidation state of the transition metal $M_2$;

b is the valency of the atom or group $X_1$; and $R_{77}$, $R_{78}$, $R_{79}$, $R_{80}$, $R_{81}$, $R_{82}$ and $R_{83}$ are independently selected from among hydrogen, halogen, hydrocarbyl, substituted hydrocarbyl, heterohydrocarbyl or substituted heterohydrocarbyl; and when any two or more of $R_{77}$–$R_{83}$ are hydrocarbyl, substituted hydrocarbyl, heterohydrocarbyl or substituted heterohydrocarbyl, said two or more can be linked to form one or more cyclic substituents.

Catalyst compounds which are especially preferred in accordance with the present invention include those having the formula:

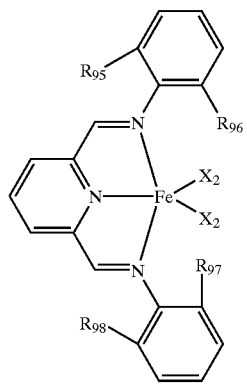

wherein $R_{95}$, $R_{96}$, $R_{97}$ and $R_{98}$ are each independently selected from among alkyls, preferably isopropyl; and each $X_2$ is independently selected from among atoms or groups covalently or ionically bonded to Fe.

In accordance with another aspect of the present invention, the catalyst compositions comprise one or more catalyst compound which is a non-metallocene, multi-dentate complexing-metal-based catalyst, i.e., a compound which includes at least one ring which contains a metal and in which one or more of the bonds making up the ring is a coordination bond involving the metal. This aspect includes compounds described above, as well as other compounds which include this multi-dentate complexing-metal ring, and excludes metallocene catalyst compounds (in which the metal is or ●-bonded to a carbocyclic ring) and Ziegler-Natta catalyst compounds such as $TiCl_4$, $TiBr_4$, $Ti(OC_2H_5)_3Cl$, $Ti(OC_2H_5)Cl_3$, $Ti(OC_3H_7)_2Cl_2$, $VCl_4$, $VOCl_3$, $ZrCl_4$ and the like.

The catalyst compositions of the present invention may include combinations of two or more catalyst compounds selected from the catalyst compounds described above, and/or may further include one or more catalyst compound outside the scope of those described above.

The catalyst activator can generally be any compound or composition which is effective for activating the catalyst compound. For example, preferred examples of suitable co-catalysts include linear or cyclic (co)oligomeric compounds having a formula selected from among (a), (b) and (c) set forth in this paragraph: (a) $(M_{co\text{-}cat}R_{105}O)_t$, where $R_{105}$ is hydrogen or a $C_1$–$C_8$ hydrocarbyl group, preferably methyl, ethyl or aryl (e.g., substituted or unsubstituted phenyl or naphthyl), and t is an integer (see U.S. Pat. No. 5,527,752, col. 6, line 19–col. 7, line 4 for a discussion of this type of co-catalyst, and suitable methods for their production), (b) $(M_{co\text{-}cat}R_{106}O)p$ $(M_{co\text{-}cat}R_{107}O)r$, wherein $M_{co\text{-}cat}$ is a metal selected from among alkali metals, alkali earth metals, rare earth metals, aluminum and tin, aluminum being preferred, $R_{106}$ and $R_{107}$ are each independently selected from among hydrogen and $C_1$–$C_8$ hydrocarbyl groups, and p and r are each independently an integer from 1 to 100; and (c) $M_{co\text{-}cat}R_{108}$, $M_{co\text{-}cat}R_{108}R_{109}$, $M_{co\text{-}cat}R_{108}R_{109}R_{110}$, or $M_{co\text{-}cat}R_{108}R_{109}R_{110}R_{111}$, wherein $M_{co\text{-}cat}$ is a metal selected from among alkali metals, alkali earth metals, rare earth metals, aluminum and tin, aluminum being preferred, and $R_{108}$, $R_{109}$, $R_{110}$ and $R_{111}$, where present, are each independently selected from among hydrogen, $C_1$–$C_8$ hydrocarbyl groups and $C_1$–$C_8$ alkoxy groups. Specific preferred examples of such co-catalysts include the aluminoxanes, in particular modified methylaluminoxane (MMAO) or methylaluminoxane (MAO). Other suitable co-catalysts include trimethyl aluminum (TMA) and tri-isobutyl aluminum (TIBA).

Co-catalysts as described above are known in the art, and can be prepared by those of ordinary skill in the art using any of a variety of known techniques. For instance, aluminoxanes may be prepared in a variety of ways. According to one method of preparing aluminoxanes, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyl-dialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further modified methylaluminoxanes, which contain both methyl groups and higher alkyl groups, i.e., isobutyl groups, may be synthesized by the reaction of a polyalkyl aluminoxane containing $C_2$ or higher alkyl groups with trimethylaluminum and then with water as disclosed in, for example, U.S. Pat. No. 5,041,584.

Any solid particulate material which is inert to the other components of the catalyst system, and during subsequent polymerization, can be employed as filler. Such materials can be organic or inorganic. Suitable fillers include fumed silica, non-fumed silica, boron nitride, titanium dioxide, zinc oxide, polystyrene, and calcium carbonate. Fumed hydrophobic silica is preferred because it imparts high viscosity to the slurry and good strength to the spray-dried particles. The particulate material employed as filler should have an average particle size no greater than 50 micrometers, preferably no greater than 10 micrometers. The particulate material employed as filler should be dry, i.e., free of absorbed water. Sufficient filler is preferably employed to produce a slurry suitable for spray-drying, i.e., a slurry containing such filler in an amount of from 0 percent by weight to about 15 percent by weight, preferably from about 2.5 percent by weight to about 10 percent by weight. When spray-dried, such slurry produces discrete catalyst particles in which filler is present in an amount of from 0 percent by weight to about 50 percent by weight, preferably from about 10 percent by weight to about 30 percent by weight. The spray-dried catalyst particles produced in this manner typically have an average particle size of from about 5 micrometers to about 200 micrometers, preferably from about 10 micrometers to about 30 micrometers.

In accordance with the present invention, at least one compound selected from among siloxanes, polyethylene glycols and crown ethers is included in the catalyst compositions of the present invention, and spray-drying such catalyst compositions according to the present invention results in spray-dried products which exhibit high degrees of uniformity of particle size and sphericity, i.e., extremely useful morphology, and provide good activity. Siloxanes and crown ethers are particularly preferred because they can provide improvements in morphology as well as increased activity (sometimes two to three times) in comparison to polymerization reactions conducted without the presence of such siloxane or crown ether compounds. Preferred siloxanes include hexamethyldisiloxane, hexaethyldisiloxane and hexaphenyldisiloxane, and preferred crown ethers include 18-crown-6-ether and 15-crown-5-ether. In addition, the present invention avoids problems caused by the tendency of MAO, when in a dried state, to take on a glassy brittle form.

The additive (siloxane, crown ether and/or polyethylene glycol) is preferably present in the catalyst composition in an amount in the range of from 0.5 mole % to about 10 mole % of the activating co-catalyst, although the present invention is not limited to this preferred range.

The amount of catalyst compound in the catalyst composition may vary over a wide range. Preferably, there is present from about 0.01 mmol to about 0.06 mmol, most preferably about 0.03 mmol, of catalyst compound per gram of catalyst composition, "catalyst composition" being defined, as above, as including the catalyst compound, the activating co-catalyst, the additive (i.e., siloxane, crown ether and/or polyethylene glycol), and a filler. It is generally preferred to use the catalyst compositions at concentrations sufficient to provide at least about 0.000001, preferably about 0.00001 percent, by weight, of transition metal based on the weight of the monomers. The upper limit of the percentages is determined by a combination of catalyst activity and process economics. When the activating cocatalyst is a branched or cyclic oligomeric poly (hydrocarbylaluminum oxide), the mole ratio of aluminum atoms contained in the poly(hydrocarbylaluminum oxide) compound to total metal atoms contained in the catalyst precursor is generally in the range of from about 2:1 to about 100,000:1, preferably in the range of from about 10:1 to about 10,000:1, and most preferably in the range of from about 50:1 to about 1,000:1. When the activating co-catalyst is of the formula $(AlR_{112}O)_p$ $(AlR_{113}O)_r$, the mole ratio of aluminum atoms contained in the $(AlR_{112}O)_p$ $(AlR_{113}O)_r$ compound to total metal atoms contained in the catalyst precursor is generally in the range of from about 1:1 to about 100,000:1, preferably in the range of from about 5:1 to about 2000:1, and most preferably in the range of from about 100:1 to about 1000:1.

In formulating the catalyst composition, it is preferred that the co-catalyst, e.g., alumoxane, be added to a slurry containing a solvent and filler, e.g., fumed silica, followed by adding the additive and then stirring for about 1 hour. Then, the catalyst compound is added and thoroughly mixed with the solvent, filler and additive to form the catalyst composition, which can then be spray-dried in accordance with the present invention.

Spray-drying may be effected by any spray-drying method known in the art. For example, one example of a suitable spray-drying method comprises atomizing a solution, suspension or dispersion of the catalyst and/or the activating co-catalyst, optionally together with a filler, and optionally with heating of the solution, suspension or dispersion. Atomization is accomplished by means of any suitable atomizing device to form discrete spherically shaped particles. Atomization is preferably effected by passing the slurry through the atomizer together with an inert drying gas, i.e., a gas which is nonreactive under the conditions employed during atomization. An atomizing nozzle or a centrifugal high speed disc can be employed to effect atomization, whereby there is created a spray or dispersion of droplets of the mixture. The volumetric flow of drying gas, if used, preferably considerably exceeds the volumetric flow of the slurry to effect atomization of the slurry and/or evaporation of the liquid medium. Ordinarily the drying gas is heated to a temperature as high as about 160 degrees C. to facilitate atomization of the slurry; however, if the volumetric flow of drying gas is maintained at a very high level, it is possible to employ lower temperatures. Atomization pressures of from about 1 psig to 200 psig are suitable. Some examples of suitable spray-drying methods include those disclosed in U.S. Pat. Nos. 5,290,745, 5,652, 314, 4,376,062, 4,728,705, 5,604,172, 5,306,350 and 4,638, 029.

FIG. 1 is a schematic representation of an example of an apparatus which is suitable for performing spray-drying in the present invention. Referring to FIG. 1, each mixture is drawn through silicone tubing from a reservoir attached at point C by a peristaltic pump D. As the mixture passes through nozzle F it is mixed with atomizing nitrogen gas, which enters the system at point E. The mist of catalyst composition thus formed in the drying chamber G is then dried in the presence of bath nitrogen gas, which enters the drying chamber at point A, heated by heater B before entering. Particles of unacceptably large diameter catalyst composition are not entrained in the nitrogen flow and drop into oversize collection pot H. The remainder of the catalyst composition continues through chamber outlet I into the cyclone separator J, where the particulate catalyst composition is disengaged from the gas stream and dropped into a removable product collection pot K, from which the fully activated catalyst composition is recovered. The nitrogen gas is drawn through the aspirator L and removed from the system at point M.

Another type of suitable spray-drying method comprises forming a liquid mixture comprising a nonvolatile materials fraction, a solvent fraction and at least one compressed fluid; and spraying the liquid mixture at a temperature and pressure that gives a substantially decompressive spray by passing the mixture through an orifice into an environment suitable for forming solid particulates by solvent evaporation. For example, such a method is disclosed in U.S. Pat. No. 5,716,558.

By adjusting the size of the orifices of the atomizer employed during spray-drying, it is possible to obtain particles having desired average particle size, e.g., from about 5 micrometers to about 200 micrometers. The particles recovered from the spray-drying can optionally be decarboxylated by heating the particles, e.g., as disclosed in U.S. Pat. No. 5,652,314.

The catalyst composition may be used for any reaction for which the catalyst is useful—preferred catalysts according to the present invention include catalysts for polymerization of olefins. Such reactions can be carried out by any suspension, solution, slurry, or gas phase process, using known equipment and reaction conditions, and is not limited to any specific type of reaction system. Such polymerization can be conducted in a batchwise mode, a continuous mode, or any combination thereof. Generally, suitable olefin polymerization temperatures are in the range of from about 0 degrees C. to about 200 degrees C. at atmospheric, subatmospheric, or superatmospheric pressures.

Preferably, gas phase polymerization is employed, at superatmospheric pressure in the range of from about 1 to about 1000 psi, preferably 50 to 400 psi, most preferably 100 to 300 psi, and at temperatures in the range of from about 30 degrees C. to about 130 degrees C., preferably about 65 degrees C. to about 110 degrees C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions sufficient to polymerize the monomer(s) and in the presence of an effective amount of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,543,399, 4,588,790, 5,352,749 and 5,462,999, and recycled to the reactor. Product is withdrawn from the reactor and make-up monomer is added to the recycle stream. In addition, a fluidization aid such as carbon black, silica, clay, or talc may be used, as disclosed in U.S. Pat. No. 4,994,534. Suitable gas phase reaction systems are also described in U.S. Pat. No. 5,527,752.

Slurry or solution polymerization processes may utilize subatmospheric or superatmospheric pressures and temperatures in the range of from about 40 degrees C. to about 110 degrees C. Useful liquid phase polymerization reaction systems are known in the art, e.g., as described in U.S. Pat. No. 3,324,095, U.S. Pat. No. 5,453,471, U.S. Pat. No. 5,527,752, U.S. Pat. No. 5,834,571, WO 96/04322 (PCT/US95/09826) and WO 96/04323 (PCT/US95/09827). Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. Preferably, reaction medium containing the olefin polymer product and unreacted olefin monomer is withdrawn continuously from the reactor. Olefin polymer product is separated, and unreacted olefin monomer is recycled into the reactor.

EXAMPLES

The following Examples are representative of the present invention.

Example 1a

In a glove box, a glass bottle was charged with 16.4 g of predried Cabosil TS-610 (fumed silica obtained from Cabot Corporation), and 240 mL toluene. To this was added a solution containing 96 g MAO/toluene solution (20 percent) and 11.4 g hexaphenyldisiloxane which had been stirred for 1 hour. Finally, 1 gram of Compound 2 (see above) was added to the slurry and the mixture was passed through a small Buchi unit (Model 190 Mini Spray-dryer). Yield: 25 g, pale yellow solid. ICP: 0.33 percent Zr, 16.0 percent Al.

Example 1b

Figure 2:
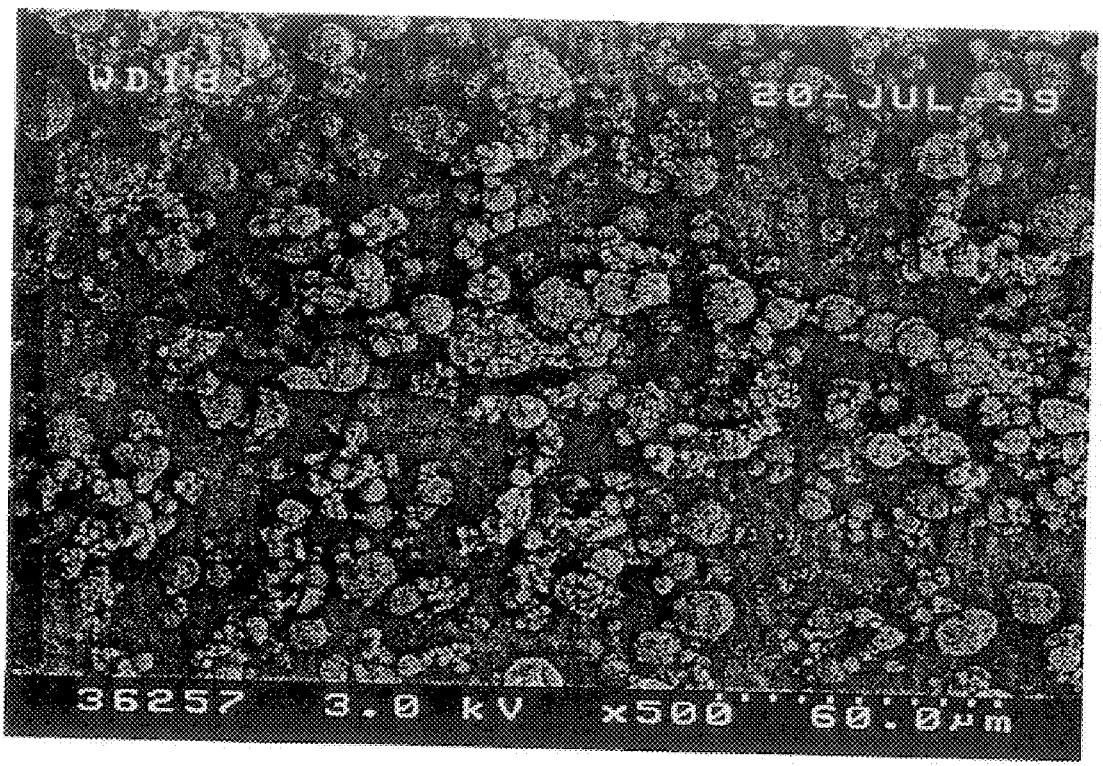
FIG. 2 is an SEM of a product formed according to the present invention, as described in Example 1b, below.

In a glove box, a glass bottle was charged with 2.15 g of predried Cabosil TS-610, and 20 mL toluene. To this was added a solution containing 24.1 g MAO/toluene solution (20 percent) and 4.85 g hexaphenyldisiloxane which had been stirred for 1 hour. Finally, 250 mg Compound 2 (see above) was added to the slurry and the mixture was passed through a small Buchi unit (Model 190 Mini Spray-dryer). Yield: 9 g, pale yellow solid. ICP: 0.26 percent Zr, 12.7 percent Al. FIG. 2 is an SEM of the product obtained. As can be seen from this SEM (particularly in comparison with FIG. 3, an SEM of a comparative test, i.e., Example 7, discussed below, in which none of the additives according to the present invention were employed), the present invention achieved improved uniformity and sphericity.

Example 1c

In a glove box, a glass bottle was charged with 3.0 g of predried Cabosil TS-610, and 50 mL toluene. To this was added a solution containing 12.05 g MAO/toluene solution (20 percent) and 480 mg hexaphenyldisiloxane which had been stirred for 1 hour. Finally, 125 mg Compound 2 (see above) was added to the slurry and the mixture was passed through a small Buchi unit (Model 190 Mini Spray-dryer). Yield: 3 g, pale yellow solid. ICP: 0.33 percent Zr, 14.2 percent Al.

Example 1d

In a glove box, a glass bottle was charged with 4.1 g of predried Cabosil TS-610, and 60 mL toluene. To this was added a solution containing 24.1 g MAO/toluene solution (20 percent) and 2.85 g hexaphenyldisiloxane which had been stirred for 1 hour. Finally, 250 mg Compound 2 (see above) was added to the slurry and the mixture was passed through a small Buchi unit (Model 190 Mini Spray-dryer). Yield: 7 g, pale yellow solid. ICP: 0.32 percent Zr, 15.8 percent Al.

Example 2a

In a glove box, a glass bottle was charged with 24.4 g of predried Cabosil TS-610, and 265 mL toluene. To this was added a solution containing 102.8 g MAO/toluene solution (20 percent) and 3.46 g hexamethyldisiloxane which had been stirred for 1 hour. Finally, 1 g of Compound 2 (see above) was added to the slurry and the mixture was passed through a small Buchi unit (Model 190 Mini Spray-dryer). Yield: 25 g, pale yellow solid. ICP: 0.35 percent Zr, 16.8 percent Al.

Example 2b

In a glove box, a glass bottle was charged with 3.33 g of predried Cabosil TS-610, and 55 mL toluene. To this was added a solution containing 12.05 g MAO/toluene solution (20 percent) and 144 mg hexamethyldisiloxane which had been stirred for 1 hour. Finally, 125 mg of Compound 2 (see above) was added to the slurry and the mixture was passed through a small Buchi unit (Model 190 Mini Spray-dryer). Yield: 3 g, pale yellow solid. ICP: 0.35 percent Zr, 22.2 percent Al.

Example 2c

In a glove box, a glass bottle was charged with 3.04 g of predried Cabosil TS-610, and 50 mL toluene. To this was added a solution containing 12.05 g MAO/toluene solution (20 percent) and 433 mg hexamethyldisiloxane which had been stirred for 1 hour. Finally, 125 mg of Compound 2 (see above) was added to the slurry and the mixture was passed through a small Buchi unit (Model 190 Mini Spray-dryer). Yield: 4 g, pale yellow solid. ICP: 0.35 percent Zr, 21.0 percent Al.

Example 3

In a glove box, a glass bottle was charged with 2.98 g of predried Cabosil TS-610, and 50 mL toluene. To this was added a solution containing 12.05 g MAO/toluene solution (20 percent) and 2.5 g 18-crown-6 which had been stirred for 1 hour. Finally, 125 mg of Compound 2 (see above) was added to the slurry and the mixture was passed through a small Buchi unit (Model 190 Mini Spray-dryer). Yield: 5 g, pale yellow solid. ICP: 0.26 percent Zr, 14.7 percent Al.

Example 4

In a glove box, a glass bottle was charged with 4.98 g of predried Cabosil TS-610, and 100 mL toluene. To this was added a solution containing 12.05 g MAO/toluene solution (20 percent) and 2.5 g polydimethyldisiloxane which had been stirred for 1 hour. Finally, 125 mg of Compound 2 (see above) was added to the slurry and the mixture was passed through a small Buchi unit (Model 190 Mini Spray-dryer). Yield: 7 g, pale yellow solid. ICP: 0.24 percent Zr, 8.68 percent Al.

Example 5-Polymerization Examples

Catalysts were prepared as described above in Examples 1b, 1c, 1d, 2c and 3. A 1 liter stirred autoclave reactor was charged with 450 cc hexane, 50 cc 1-hexene, ca. 1000 equivalents/{Zr} of TiBA, and sufficient catalyst oil slurry to give a charge of ~0.5–1.0 micromoles {Zr}. The reactor was charged with 1-hexene and the temperature was raised to 60 degrees C. Ethylene was fed to maintain a desired reactor pressure, the catalyst charged by pressure injection and the temperature was controlled to 75 degrees C. After the time as set forth in Table 1, ethylene feed was stopped, the reactor was cooled and vented, and granular polyethylene was recovered. Results are given in Table 1:

TABLE 1

| Catalyst | Zr ($\mu$mol) | Al/Zr | $C_2$ (psi) | $C_2$ (liters) | Time (min) | Yield (g) | Std. PE activity[b] | Melt Index |
|---|---|---|---|---|---|---|---|---|
| 1c | 0.9 | 1078 | 90 | 46.9 | 10 | 58.4 | 584,075 | — |
| 1c | 0.4 | 1148 | 90 | 36.1 | 30 | 33.6 | 230,207 | 0.13 |
| 1d | 0.9 | 1082 | 90 | 41.4 | 7 | 50 | 717,058 | — |
| 1d | 0.4 | 1343 | 90 | 32.2 | 30 | 37.2 | 298,183 | 1.0 |
| 2c | 0.9 | 1029 | 90 | 48.5 | 20 | 52.5 | 250,612 | 0.3 |
| 3 | 0.9 | 1060 | 90 | 12.3 | 12 | 26.4 | 216,425 | 3.0 |
| 1b | 0.3 | 3041 | 70 | 36.5 | 30 | 37.3 | 497,219 | 0.7 |

[a]Conditions include: 450 ml hexane, 50 cc hexene, no hydrogen
[b]Units of $g(PE) \cdot 100\ psi(C2)^{-1} \cdot mmol\ Zr \cdot h^{-1}$ Example 6-Polymerization Examples Catalyst was prepared as described above in Example 1a. Polymerization was carried out in a fluid bed gas phase reactor. The yield of high molecular weight, low density ethylene-hexene copolymer prepared was 27 lbs. The conditions included the use of TiBA as the scavenger, 115 psig ethylene, hexene comonomer at 75 degrees C. Results are shown in Table 2:

TABLE 2

| Catalyst | Res. Zr ppm | Flow Index | Resin aps, in. | Bulk density, lb/ft$^3$ | Yield (lbs) |
|---|---|---|---|---|---|
| 1a | 1.6 | n/a | 0.055 | 17.4 | 17 |

"Res. Zr" is the amount (in ppm) of residual Zr contained in the product polymer, as measured by ICP (Inductively Coupled Plasma). Flow Index was determined according to ASTM D-1238—Condition F. "resin aps, in." is the average particle size (aps), in inches, of the product polymer, measured by sieving resin through fine meshes (10/18/35/60/120/200/pan) and averaging the size of the resin left on each of the screens.

Example 7

Figure 3:
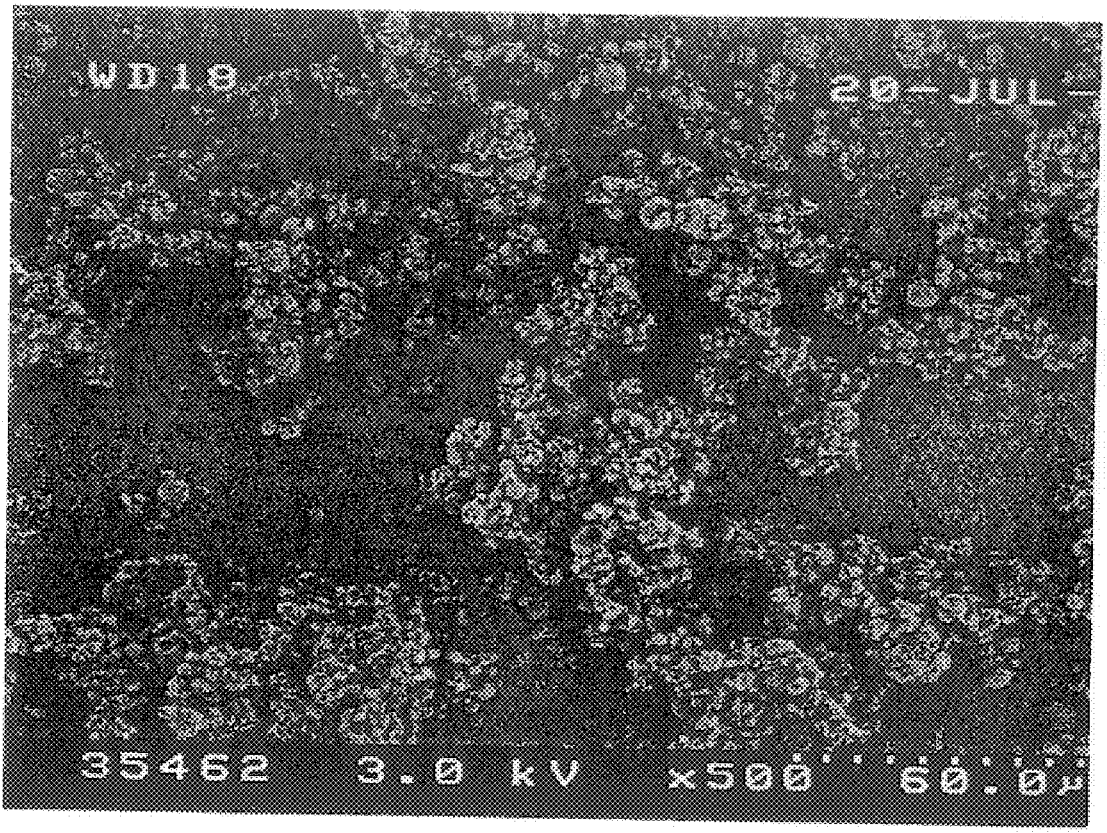
FIG. 3 is an SEM of a comparative product, formed as described in Example 7, below.

In a glove box, a glass bottle was charged with 2.97 g of predried Cabosil TS-610, and 60 mL toluene. To this was added a solution containing 9.64g MAO/toluene solution (20 percent) followed by 100 mg of Compound 2 (see above) as a solid. The slurry was stirred for 30 minutes and the mixture was passed through a small Buchi unit (Model 190 Mini Spray-dryer). Yield: 3 g, pale yellow solid. FIG. 3 is an SEM of the product obtained.

Although the compounds, compositions and processes in accordance with the present invention have been described in connection with preferred embodiments, it will be appreciated by those skilled in the art that modifications not specifically described may be made without departing from the spirit and scope of the invention defined in the following claims.

What is claimed is:

1. A method of spray-drying a catalyst composition comprising atomizing a mixture comprising said catalyst composition, an inert liquid hydrocarbon medium, and at least one inert drying gas thereby creating a spray or dispersion of droplets comprising said catalyst composition, and evaporating the inert liquid hydrocarbon medium, said catalyst composition comprising a catalyst compound, an activator for said catalyst compound and at least one compound selected from the group consisting of siloxanes, polyethylene glycols and crown ethers.

2. The method of claim 1, wherein said catalyst composition further comprises at least one filler.

3. The method of claim 1, wherein said catalyst compound is selected from the group consisting of:

i) compounds having the formula:

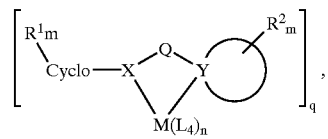

wherein

M is selected from the group consisting of Group 3–Group 13 and the Lanthanides;

each $L_4$ is selected from the group consisting of hydrogen, halogen, $C_{1-50}$ alkyl, $C_{1-50}$ aryl, $C_{1-50}$ alkenyl, $C_{1-50}$ alkylaryl, $C_{1-50}$ arylalkyl, $C_{1-50}$ hydrocarboxy, $C_{1-50}$ amide, $C_{1-50}$ phosphide, $C_{1-50}$ sulfide, $C_{1-50}$ silylalkyl, $C_{1-50}$ diketonate, and $C_{1-50}$ carboxylate;

q is 1 or 2;

n is an integer from 1 to 4;

each $R^1$ independently contains 1–50 atoms at least one of which is selected from the group consisting of hydrogen, and Group 13–Group 17 elements, and 2 or more adjacent $R^1$ groups may be joined to form a cyclic moiety;

each $R^2$ independently contains 1–50 atoms, at least one of which is selected from the group consisting of hydrogen, and Group 13–Group 17 elements;

Q is a bridging group containing at least one Group 13–Group 16 element;

each m is independently an integer from 0 to 5;

X and Y are independently selected from the group consisting of N, O, S and P;

is a $C_{2-7}$ heterocyclic ring; and

Cyclo is a cyclic moiety;

ii) compounds having one of the following formulas or dimers thereof:

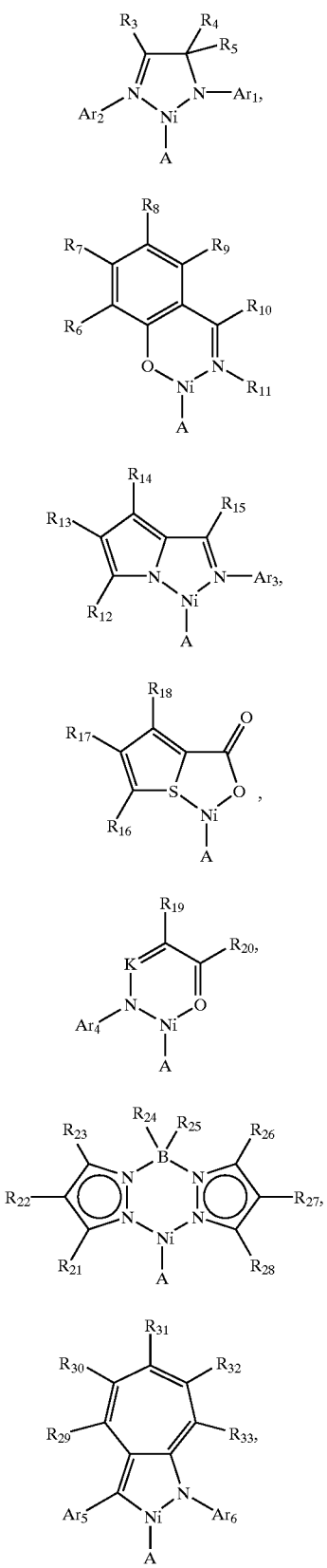

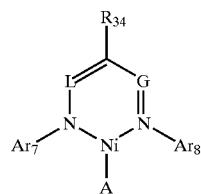

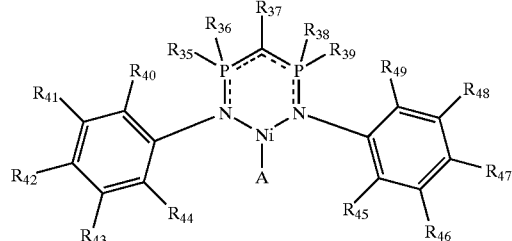

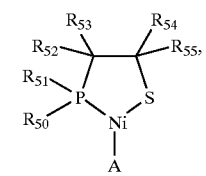

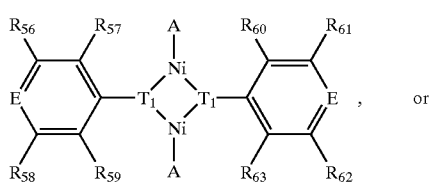

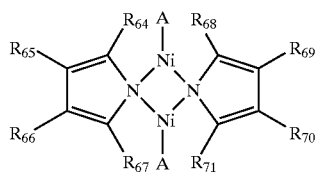

wherein:
- $Ar_1$, $Ar_2$, $Ar_3$, $Ar_4$, $Ar_5$, $Ar_6$, $Ar_7$ and $Ar_8$ are each independently aryl or substituted aryl;
- $R_3$ and $R_4$ are each independently hydrogen, hydrocarbyl, substituted hydrocarbyl, or $R_3$ and $R_4$ taken together form a ring, and $R_5$ is hydrogen, hydrocarbyl or substituted hydrocarbyl, or $R_3$, $R_4$ and $R_5$ together form a ring;
- A is a π-allyl or π-benzyl group;
- $R^{10}$ and $R^{15}$ are each independently hydrogen, hydrocarbyl or substituted hydrocarbyl;
- $R_6$, $R_7$, $R_8$, $R_9$, $R_{12}$, $R_{13}$ $R_{14}$, $R_{16}$, $R_{17}$, $R_{18}$, $R_{21}$, $R_{22}$, $R_{23}$, $R_{26}$, $R_{27}$, $R_{28}$, $R_{29}$, $R_{30}$, $R_{31}$, $R_{32}$ and $R_{33}$ are each independently hydrogen, hydrocarbyl, substituted hydrocarbyl, or an inert functional group, and provided that any two of these groups vicinal to one another taken together do not form a ring or do form a ring;
- K is N or $CR_{99}$;
- $R_{20}$ is hydrocarbyl, substituted hydrocarbyl, $-SR_{100}$, $-OR_{100}$, or $-N(R_{101})_2$, $R_{19}$ is hydrogen, a functional group, hydrocarbyl or substituted hydrocarbyl, and $R_{99}$ is hydrocarbyl or substituted hydrocarbyl, and provided that $R_{19}$ and $R_{20}$ or $R_{19}$ and $R_{99}$ taken together form a ring or do not form a ring;

$R_{100}$ is hydrocarbyl or substituted hydrocarbyl;

each $R_{101}$ is independently hydrogen, hydrocarbyl or substituted hydrocarbyl;

G and L are both N or G is $CR_{102}$ and L is $CR_{103}$;

$R_{103}$, $R_{34}$ and $R_{102}$ are each independently hydrogen, hydrocarbyl or substituted hydrocarbyl, or any two of $R_{103}$, $R_{34}$ and $R_{102}$ taken together form a ring;

$R_{11}$ is hydrocarbyl or substituted hydrocarbyl;

$R_{37}$, $R_{40}$, $R_{41}$, $R_{42}$, $R_{43}$, $R_{44}$, $R_{45}$, $R_{46}$, $R_{47}$, $R_{48}$ and $R_{49}$ are each independently hydrogen, hydrocarbyl, substituted hydrocarbyl, or a functional group;

$R_{35}$, $R_{36}$, $R_{38}$ and $R_{39}$ are each independently hydrocarbyl or substituted hydrocarbyl;

$R_{50}$ and $R_{51}$ are each independently hydrocarbyl or substituted hydrocarbyl;

$R_{52}$, $R_{53}$, $R_{54}$ and $R_{55}$ are each independently hydrogen, hydrocarbyl, substituted hydrocarbyl or a functional group;

both of $T_1$ are sulfur or NH;

each E is nitrogen or $CR_{104}$ wherein $R_{104}$ is hydrogen, hydrocarbyl, substituted hydrocarbyl or a functional group;

$R_{56}$, $R_{57}$, $R_{58}$, $R_{59}$, $R_{60}$, $R_{61}$, $R_{62}$ and $R_{63}$ are each independently hydrogen, hydrocarbyl, substituted hydrocarbyl, or a functional group;

$R_{64}$, $R_{65}$, $R_{66}$, $R_{67}$, $R_{68}$, $R_{69}$, $R_{70}$ and $R_{71}$ are each independently hydrogen, hydrocarbyl, substituted hydrocarbyl or a functional group;

s is an integer of 1 or more; and $R_{24}$ and $R_{25}$ are each independently hydrogen, hydrocarbyl or substituted hydrocarbyl, iii) compounds having the formula:

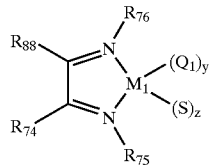

wherein:

$M_1$ is Ti, Zr, Sc, V, Cr, a rare earth metal, Fe, Co, Ni or Pd, having an oxidation state j;

$y+z=j$;

$R_{75}$ and $R_{76}$ are each independently hydrocarbyl or substituted hydrocarbyl, provided that the carbon atom bound to the imino nitrogen atom has at least two carbon atoms bound to it;

$R_{74}$ and $R_{88}$ are each independently hydrogen, hydrocarbyl, substituted hydrocarbyl, or $R_{74}$ and $R_{88}$ taken together are hydrocarbylene or substituted hydrocarbylene to form a ring; and $Q_1$ and S are each independently selected from among alkyl, hydride, chloride, iodide or bromide; and iv) compounds having the formula:

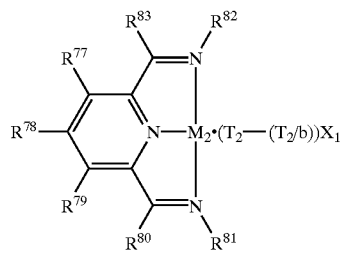

wherein $M_2$ is Fe[II], Fe[III], Co[I], Co[II], Co[III], Mn[I], Mn[II], Mn[III], Mn[IV], Ru[II], Ru[III], or Ru[IV];

$X_1$ is an atom or group covalently or jonically bonded to $M_2$;

$T_2$ is the oxidation state of the transition metal $M_2$;

b is the valency of the atom or group $X_1$; and $R_{77}$, $R_{78}$, $R_{79}$, $R_{80}$, $R_{81}$, $R_{82}$ and $R_{83}$ are independently selected from among hydrogen, halogen, hydrocarbyl, substituted hydrocarbyl, heterohydrocarbyl or substituted heterohydrocarbyl; and when any two or more of $R_{77}$–$R_{83}$ are hydrocarbyl, substituted hydrocarbyl, heterohydrocarbyl or substituted heterohydrocarbyl, said two or more are not linked or are linked to form one or more cyclic substituents.

4. The method of claim 1, wherein said catalyst compound is selected from the group consisting of

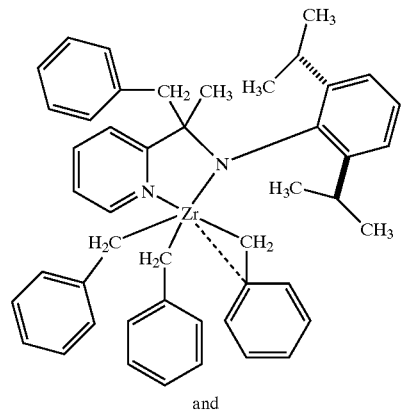

and

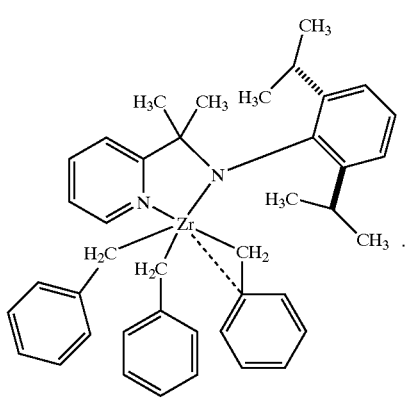

5. The method of claim 1, wherein said activator for said catalyst compound is MAO and/or MMAO.

6. A method according to claim 1 wherein the mixture is atomized by passing through an atomizer comprising an atomizing nozzle or a centrifugal high speed disc.

7. A method of spray-drying a catalyst composition comprising atomizing a mixture comprising said catalyst composition, a liquid medium, and at least one inert drying gas thereby creating a spray or dispersion of droplets comprising said catalyst composition, and evaporating the liquid medium, said catalyst composition comprising a catalyst compound selected from the group consisting of:

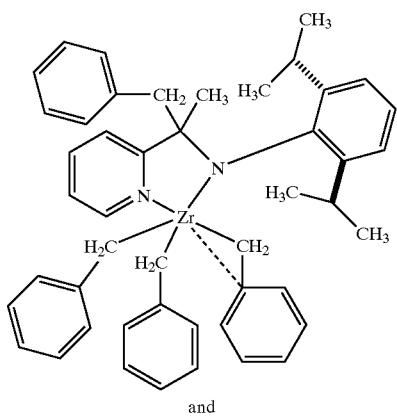

and

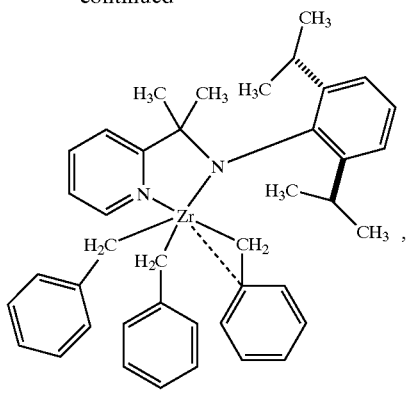

an activator for said catalyst compound and at least one compound selected from the group consisting of siloxanes, polyethylene glycols and crown ethers.

8. A method according to claim 7, wherein the mixture is atomized by passing through an atomizer comprising an atomizing nozzle or a centrifugal high speed disc.

9. The method of claim 7 or 8, wherein said catalyst composition further comprises at least one filler.

10. The method of claim 7 or 8, wherein said activator for said catalyst compound is MAO and/or MMAO.

11. The method of claim 9, wherein said activator for said catalyst compound is MAO and/or MMAO.

* * * * *